Patented Apr. 25, 1933

1,905,383

UNITED STATES PATENT OFFICE

WALTER F. HUPPKE AND FREDERICK E. FREY, OF BARTLESVILLE, OKLAHOMA, ASSIGNORS TO PHILLIPS PETROLEUM COMPANY, OF BARTLESVILLE, OKLAHOMA

METHOD FOR HYDROGENATING OR DEHYDROGENATING HYDROCARBONS

No Drawing.    Application filed July 22, 1930. Serial No. 469,915.

This invention relates to processes of treating hydrocarbons and it comprises a process wherein a saturated hydrocarbon, for example, propane, is dehydrogenated in the presence of a catalyst composed of a chromic oxide gel; it further comprises processes in which the hydrogen or dehydrogenated hydrocarbon is removed from the system during the catalytic treatment; and it further comprises processes wherein unsaturated hydrocarbons are hydrogenated in the presence of a chromic oxide gel.

The unsaturated hydrocarbons of the aliphatic series are valuable raw materials for many purposes. Ethylene, and the higher olefins, may be converted into glycols, dichlorides, chlorhydrins, olefin oxides etc. each of these substances having economic importance. In motor fuels, relatively large quantities of unsaturated hydrocarbons are desirable since they impart antiknock qualities to such fuels. Ethylene is usually made by dehydrating ethyl alcohol although large amounts are obtained as by-products in cracking hydrocarbons and in the pyrogenetic treatment of natural gas.

It is an object of our invention to provide processes whereby saturated aliphatic or straight-chain hydrocarbons can be dehydrogenated to form the industrially valuable unsaturated compounds (olefins). Processes to this end have been described in the literature but so far as we are aware, yields of unsaturated hydrocarbons have not been of commercial significance. Thermodynamic calculations permit us to fix the temperatures and pressures best suited to the formation of respectable amounts of olefins from the corresponding paraffins. In the absence of catalysts however, the dehydrogenation proceeds so slowly that long periods of time are required before equilibrium is reached. This is a marked disadvantage and many catalysts that have been proposed are so low in activity that long contact of the paraffins therewith results in cracking, i. e. the carbon chain is disrupted or broken so that hydrocarbons having lesser carbon atoms are formed.

While catalysts have been suggested, the requirements are so strict that none hitherto noted in the literature have been very efficient. This is in part due to the fact that the catalyst selected ought to have high activity within the temperature range fixed by thermodynamics as best suited to the formation of high yields of unsaturates. In general, a compromise between catalytic activity and temperature has been necessary. That is to say, the temperature of the dehydrogenation has been kept within the limits of catalytic activity even though the temperature chosen is not the best according to thermodynamic calculations.

Chromic oxide has been suggested as a dehydrogenation catalyst. It is usually prepared by the dry reduction of chromic acid or by precipitating chromic oxide from a nitrate solution with ammonia and subsequently drying the precipitate. Such chromic oxide catalysts give inferior results.

We have now found that the catalytic activity of chromic oxide in dehydrogenation reactions is markedly affected by the physical condition of the chromic oxide and we have found further that chromic oxide in gel form possesses greatly increased catalytic activity in reactions of this type. While physical structure probably plays a large part in the effectiveness of such catalysts, we do not wish to regard this as the only explanation of the marked increase in catalytic activity. Undoubtedly other factors not yet understood enter into the matter.

Our catalyst permits us to dehydrogenate hydrocarbons at so fast a velocity that conditions may be selected at which virtually no cracking takes place. That is to say, we can increase the volume flow per unit time of saturated hydrocarbons over the catalyst to the point at which no fracture of carbon-carbon bonds occurs; hence only normal dehydrogenation takes place without loss of conversion efficiency. We regard this feature of considerable importance since undesirable by-products are avoided.

Our catalyst can be prepared in various ways but in any event conditions should be such that the gel structure is not destroyed on heating. To illustrate—when chromic oxide is precipitated from chromic nitrate solutions with ammonia in the ordinary way, a gel is initially obtained. But when such a gel is dried and heated it suffers a change in physical condition; the dried product loses its gel structure and shows poor catalytic activity. However, if sodium or potassium hydroxide be used instead of ammonia, gels are obtained which retain their gel structure on drying and heating and have good catalytic activity. We have also found that if the ammonia precipitation be conducted in the presence of acetic acid, sulphuric acid, aluminum salts or soluble silicates, the dried gel shows high dehydrogenation activity. Properly prepared gels are dark colored, translucent and vitreous.

One advantageous way of preparing such highly reactive gels is as follows. Acetic acid is added to a 10 percent aqueous solution of chromic nitrate until the solution contains 20 percent of acid. Ammonia is then added until in slight excess. The precipitated gel is removed from the supernatant liquid, washed thoroughly with water and slowly dried. The dried gel is dark colored, translucent and vitreous and possesses a highly developed gel structure which is retained when the gel is heated in use as a catalyst.

Similar results are obtained when sodium or potassium hydroxide is used to precipitate the oxide as a gel and when these reagents are chosen, the acetic acid or other addition agent necessary when ammonia is used may be omitted. In any case, the presence of chlorides should be avoided.

Such highly active chromic oxide gels seem to work best at temperatures of between 325° C. and 550° C. Above or below these temperatures the activity falls off somewhat. Consequently we find it best to carry out the dehydrogenation of saturated hydrocarbons within these temperatures even though the extent of conversion to unsaturated hydrocarbons is limited to the thermodynamic equilibrium values within this range.

The catalyst, in granular gelled form, is employed in ways customary in dehydrogenation processes of this kind. Usually a quantity of it is maintained in a catalyst chamber through which the hydrocarbon vapors pass. In the conversion of propane to propylene for example, a 5 cubic centimeter tube was filled with the chromic oxide gel, previously granulated, and the tube and contents heated to 400° C. Propane was introduced at the rate of 10 liters per hour and 4 percent thereof was converted to propylene and hydrogen. This is virtually the equilibrium value for the reaction at this temperature. Only traces of products other than propylene and hydrogen were obtained. The high activity of the catalyst permits a rapid flow of hydrocarbons through the catalyst chamber without decreasing the percentage conversion below that theoretical and this possibly explains why only traces of undesirable products were formed. Were a catalyst of less activity used, such as the ordinary chromic oxide catalysts hitherto proposed, the rate of vapor flow would have to be markedly decreased in order to obtain a 4 percent conversion in a single passage through the catalyst. But due to the lengthened time of contact with the catalyst at elevated temperature cracking of the hydrocarbon molecules themselves would occur and thus undesirable quantities of by-products formed.

With chromic oxide catalysts having a gel structure which is retained at high temperatures the rate of vapor flow can be decreased considerably if desired without cracking occurring. In another modification of our process, we have passed propane through a mass of granular chromic oxide gel at the rate of 4 liters per hour, the temperature being 400° C. with the quantity of catalyst as before. A 4 percent conversion to propylene with but traces of by-products was obtained.

The initial activity of the catalyst can be increased somewhat if it is subjected to a current of hydrogen prior to contact with the hydrocarbons to be dehydrogenated.

The extent of conversion can be increased by withdrawing conversion products from the system. For example, the exit gases leaving the catalyst can be treated to remove their olefin content by passing them into contact with sulphur dioxide or sulphuric acid. Gases thus denuded of olefins can then be recirculated through the catalyst. Carrying out the dehydrogenation under reduced pressure is also advantageous. Alternatively the exit gases can be brought into contact with a hydrogen binding material such as copper oxide or copper oxide can be incorporated in the catalyst mass. In such cases the gases can be recirculated until practically all the saturated hydrocarbons are converted to unsaturates.

One of the most advantageous ways of increasing the percentage conversion is to add an unsaturated hydrocarbon to the hydrocarbon to be dehydrogenated, the unsaturated hydrocarbon being one whose paraffin equivalent is less readily dehydrogenated than that treated. For example, sufficient ethylene can be mixed with propane so that the hydrogen liberated from the propane unites with the ethylene forming ethane. Thus an initially introduced mixture of ethylene and propane is converted to a mixture of ethane and propylene. In a similar manner, the dehydrogenation of normal butane to 1-butene and 2-butene can be increased if ethylene be added to the butane prior to passage over the catalyst. Both of these observations show that ethane is less readily dehydrogenated than propane, butane, pentane, hexane etc. under the conditions most suitable for the dehydrogenation of the paraffins above ethane. Ethane however, can be dehydrogenated to ethylene by means of our catalyst.

Chromic oxide catalysts in gel form are also advantageous hydrogenation catalysts and propylene can be converted to propane by passing a mixture of propylene and hydrogen over such a catalyst at temperatures within its activity range. At 400° C. 96 per cent of the propylene is converted to propane, this being the thermodynamic equilibrium value at this temperature.

Highly saturated hydrocarbon motor fuels, such as gasoline containing but small amounts of olefins, can be improved by passing such hydrocarbons over the heated catalyst. In this manner the amounts of unsaturates in the fuel can be increased and the anti-knock qualities enhanced.

Our invention is not to be regarded as restricted to the treatment of any particular paraffin hydrocarbon since all of the industrially important ones containing from two to six or more carbon atoms may be dehydrogenated with the catalyst we have described. So also, the hydrogenation of olefins to saturated hydrocarbons falls within the scope of our invention although we do not regard dehydrogenation and hydrogenation reactions as equivalents. Some catalysts previously described are only suitable for one or the other reaction. Chromic oxide gels, we have found, are good catalysts for both types of reactions. We find it convenient in the appended claims to describe both hydrogenation and dehydrogenation generically as a changing of the carbon-hydrogen ratio.

We claim:

1. In the catalytic treatment of aliphatic hydrocarbons at elevated temperature to change the carbon-hydrogen ratio thereof, the step which includes passing the hydrocarbon into contact with a chromic oxide gel, which is stable at such temperature.

2. In the catalytic treatment of aliphatic hydrocarbons to change the carbon-hydrogen ratio thereof, the step which includes passing the hydrocarbon into contact with a chromic oxide gel maintained at a temperature of approximately 325°–550° C.

3. In the catalytic treatment of aliphatic hydrocarbons at elevated temperature to change the carbon-hydrogen ratio thereof, the step which includes passing the hydrocarbon into contact with a dark, translucent, vitreous chromic oxide gel, which is stable and retains its gel character at such temperature.

4. In the catalytic treatment of aliphatic hydrocarbons to change the carbon-hydrogen ratio thereof, the step which includes passing the hydrocarbon into contact with a dark, translucent, vitreous chromic oxide gel maintained at a temperature of 325°–550° C.

5. In the catalytic dehydrogenation of saturated aliphatic hydrocarbons to form corresponding olefins, the step which includes passing a saturated hydrocarbon into contact with a heated chromic oxide gel.

6. In the catalytic dehydrogenation of saturated aliphatic hydrocarbons, the step which includes passing a saturated hydrocarbon into contact with a chromic oxide gel heated to a temperature of approximately 325°–550° C.

7. In the catalytic dehydrogenation of saturated hydrocarbons, passing such a hydrocarbon into contact with a dark, translucent, vitreous chromic oxide gel maintained at a temperature of 325°–550° C.

8. In the hydrogenation of unsaturated aliphatic hydrocarbons, the step which includes passing such a hydrocarbon together with hydrogen into contact with a heated chromic oxide gel.

9. In the hydrogenation of unsaturated aliphatic hydrocarbons, the step which includes passing such a hydrocarbon together with hydrogen into contact with a dark, translucent, vitreous chromic oxide gel maintained at a temperature of approximately 325°–550° C.

10. The process of dehydrogenating and hydrogenating aliphatic hydrocarbons higher than methane which comprises passing a mixture of ethylene and a saturated hydrocarbon higher than ethylene into contact with a heated chromic oxide gel to form ethane and dehydrogenate the higher hydrocarbon.

11. The process of dehydrogenating and hydrogenating aliphatic hydrocarbons higher than methane which comprises passing a mixture of ethylene and higher saturated hydrocarbons into contact with a dark, translucent, vitreous chromic oxide gel maintained at a temperature of approximately 325°–550° C.

12. The process of dehydrogenating paraffin hydrocarbons higher than methane which comprises passing the hydrocarbon into contact with a heated chromic oxide gel, abstracting one of the reaction products from the resulting mixture of products and recirculating the remainder of the reaction products.

13. The process of dehydrogenating paraffin hydrocarbons higher than methane which comprises passing the hydrocarbon into contact with a dark, translucent, vitreous chromic oxide gel, abstracting one of the reaction products from the resulting mixture of products and recirculating the remainder of the reaction products, the chromic oxide gel being maintained at a temperature of 325°–550° C.

14. The process as in claim 12 wherein the hydrogen is abstracted from the reaction products.

15. The process as in claim 13 wherein the hydrogen is abstracted from the reaction products.

16. The process for preparing hydrogen which comprises passing saturated aliphatic hydrocarbons in contact with a chromic oxide gel at a temperature of 325 to 550° C. to effect dehydrogenation, and thereafter separating the hydrogen so produced.

In testimony whereof, we hereto affix our signatures.

WALTER F. HUPPKE.
FREDERICK E. FREY.